United States Patent [19]

Hayashi et al.

[11] Patent Number: 4,600,867
[45] Date of Patent: Jul. 15, 1986

[54] MOTOR SPEED CONTROLLING DEVICE

[75] Inventors: Ikuo Hayashi; Takaharu Idogaki, both of Okazaki; Hisasi Kawai, Toyohashi, all of Japan

[73] Assignee: Nippon Soken, Inc., Nishio, Japan

[21] Appl. No.: 666,608

[22] Filed: Oct. 30, 1984

[30] Foreign Application Priority Data

Nov. 1, 1983 [JP] Japan .................. 58-205433
Jun. 14, 1984 [JP] Japan .................. 59-122340
Jul. 3, 1984 [JP] Japan .................. 59-138220

[51] Int. Cl.$^4$ ............................................ H02P 7/06
[52] U.S. Cl. ................... 318/341; 318/314; 318/327; 318/329; 318/318
[58] Field of Search ............... 318/310, 311, 313, 314, 318/315, 318, 326, 327, 329, 345 A, 345 E, 439, 139, 341, 463, 470, 560, 565, 595, 599, 601, 604, 605, 606, 607, 608, 615, 616, 617, 618, 627, 628, 632

[56] References Cited

U.S. PATENT DOCUMENTS

| | | | |
|---|---|---|---|
| 3,298,622 | 1/1967 | Raymond et al. | 318/314 |
| 3,401,321 | 9/1968 | Miki | 318/314 X |
| 3,976,926 | 8/1976 | Egbert | 318/341 X |
| 4,061,950 | 12/1977 | Kayanuma | 318/314 |
| 4,079,302 | 3/1978 | Norton | 318/632 |
| 4,123,779 | 10/1978 | Goldschmidt | 318/314 X |
| 4,354,146 | 10/1982 | Tenmyo et al. | 318/341 |
| 4,366,422 | 12/1982 | Rhodes | 318/616 X |
| 4,430,606 | 2/1984 | Otsuki et al. | 318/601 |
| 4,443,742 | 4/1984 | Schneider | 318/314 X |

Primary Examiner—Bernard Roskoski
Assistant Examiner—Shik Luen Paul Ip
Attorney, Agent, or Firm—Cushman, Darby & Cushman

[57] ABSTRACT

A motor speed controlling device comprises a rotating shaft connected to an axle and having rotation speed (set speed) varying with the passage of time, a motor with an output shaft connected to a pointer of a speedometer by means of an eddy-current coupling, rotation detectors generating pulse signals respectively proportional to the rotation speed in the rotating shaft and the output shaft and having the same frequency and the same pulse width at the same rotation speed, a logical operation circuit for discriminating the binary state of both pulse signals, and an integrating circuit which increases driving signal to the motor at a definite gradient when one pulse signal is in the 1 state and the other pulse signal is in the 0 state and decreases the driving signal at a definite gradient when one pulse signal is in the 0 state and other pulse signal is in the 1 state and holds the driving signal to the constant value when both pulse signals are at the same level. The rotation speed of the motor accurately follows the set speed according to the driving signal varying as above described and the speedometer pointer connected through the eddy-current coupling to the motor indicates the vehicle speed.

13 Claims, 14 Drawing Figures

MOTOR SPEED CONTROLLING DEVICE

BACKGROUND OF THE INVENTION

The present invention relates to speed controlling devices, and more particularly to a speed controlling device which makes a motor speed follow a set speed value varying with the passage of time.

In a conventional speedometer system for a vehicle, a meter cable is laid between an axle and a meter pointer. One end of the meter cable is connected integrally with and rotated by the axle, and the other end thereof is connected by way of an eddy current coupling to the meter pointer in order to move the pointer according to the rotating speed of the axle, i.e. the running speed of the vehicle. In this system, a space for laying the meter cable is required and moreover the fatigue of the cable itself must be taken into account as another problem.

If the rotating speed of the motor can accurately follow that of the rotating body such as the above-mentioned axle whose rotating speed varies with the passage of time, the meter pointer may be connected to the motor by way of the eddy current coupling whereby the compact and highly reliable speedometer without using any meter cable is available.

SUMMARY OF THE INVENTION

An object of the present invention is to provide a motor speed controlling device which can make the motor speed accurately follow the set value of speed varying with the passage of time.

Another object of the invention is to provide an inexpensive motor speed controlling device whose circuit formation is simple.

A further object of the invention is to provide a motor speed controlling device suitably available for a vehicle speedometer.

A motor speed controlling device according to the present invention is provided with a set pulse signal generating means which generates the set pulse signal of constant pulse width having frequency proportional to the set speed varying with the passage of time, a rotation pulse signal generating means which detects the rotating speed of the motor and generates the rotation pulse signal of constant pulse width having frequency proportional to the rotation speed, and a motor driving means which discriminates the binary state of each of the set pulse signal and the rotation pulse signal so as to keep constant the driving signal to the motor if the two signals are equivalent to the binary state or so as to change the driving signal to the motor in a definite gradient if the two signals are different in the binary state. Thus the rotating speed of the motor can accurately follow the set speed value by means of the changeable driving signal.

BRIEF DESCRIPTION OF THE DRAWINGS

FIG. 2 is a circuit diagram of a waveform shaping circuit and a one-shot circuit;

FIG. 3 is a circuit diagram of a logical operation circuit and an integrating circuit;

FIG. 4 is a circuit diagram of an amplifier circuit;

FIGS. 5A to 5C are time charts showing the controlling motion;

FIGS. 7 and 8 show a third embodiment;

FIG. 7 is a circuit diagram of a logical operation circuit and an integrating circuit.

DESCRIPTION OF THE PREFERRED EMBODIMENTS

Both the constitution and the operation of the present invention will now be described by way of examples shown in the accompanying drawings.

Figure 1:
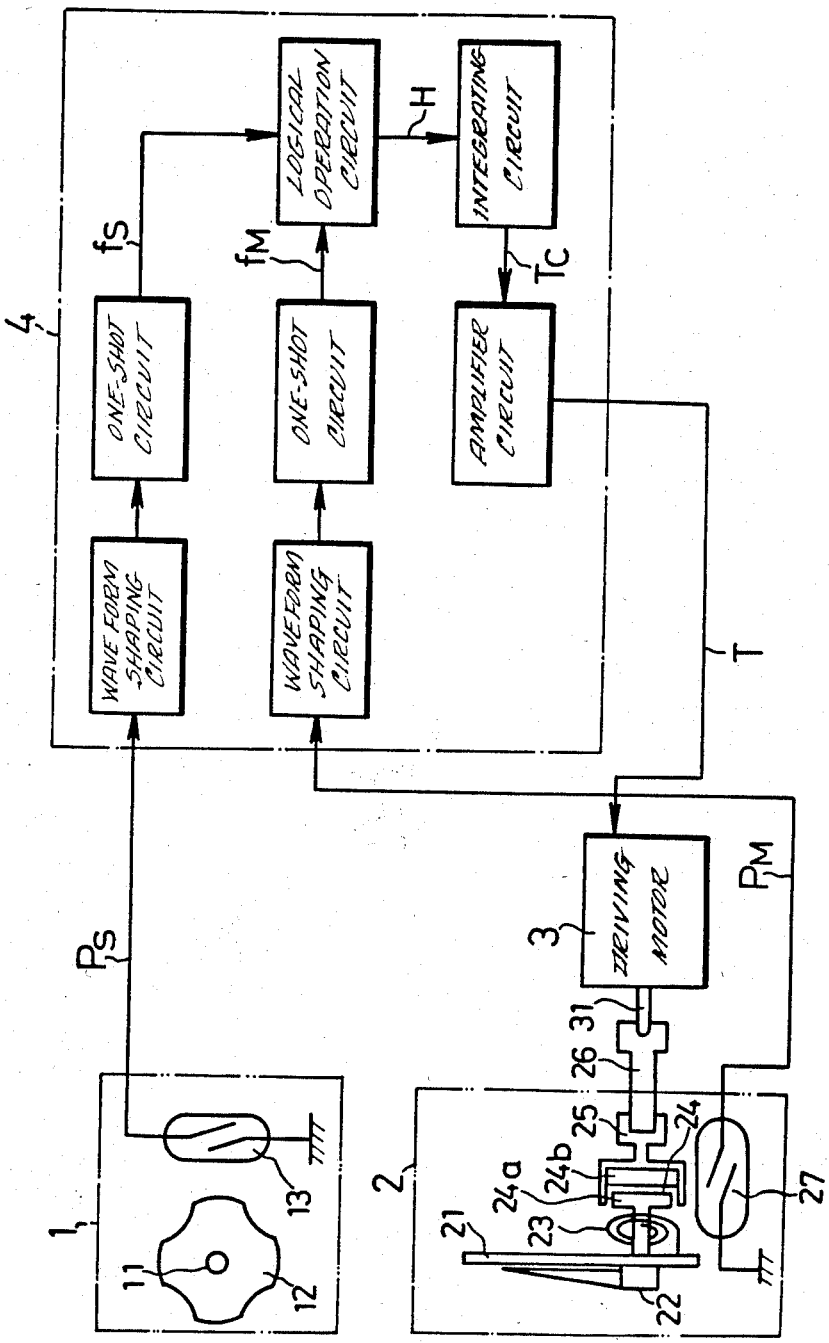
FIG. 1 is a block diagram showing an example of applying a motor speed controlling device of the invention to a speedometer for a vehicle.

FIGS. 1 through 5 show the first embodiment of the invention. FIG. 1 shows the whole structure of a speedometer for a vehicle to which the invention is applied. In the figure, reference numeral 1 designates a rotating body speed detecting sensor to constitute a set pulse signal generating means. A rotating shaft 11 in the sensor 1 is connected to an axle of a vehicle(not shown), and a permanent magnet 12 with four magnetic poles in a regular space along its circumference is fitted on the rotating body 11. A reed switch 13 as a first rotation detector is arranged near the magnet 12, and everytime each magnetic pole of the permanent magnet 12 passes through it the contact of the reed switch 13 is closed so as to generate the rotating shaft speed pulse signal $P_s$ in accordance with the rotation speed of the rotating shaft 11. Consequently, if the rotation speed of the rotating shaft 11 is represented by $N_1$, frequency $f_1$ of the pulse signal $P_s$ becomes $f_1 = 4N_1$.

Numeral 2 designates a speed indicating section as a rotation pulse signal generating means. The speed indicating section 2 is provided with an indicating pointer 22 which can turn round over a dial 21, and the end of the rotating shaft of the pointer 22 is formed into a conductor plate 24a of disc-like shape. A permanent magnet 24b also in disc-like shape is opposed to the conductor plate 24a, and an eddy current coupling 24 is constituted by the magnet 24b and the conductor plate 24a. The magnet 24b is held by a holder 25 and connected through a joint 26 to an output shaft 31 of a D.C. motor 3. The magnet 24b has four magnetic poles in a regular space along its circumference, and as the magnet 24b is rotated the eddy current is produced on the conductor plate 24a whereby the rotation moment is transferred. A spring 23 is installed on the rotating shaft of the indicating pointer 22 for biasing the pointer 22 in the return direction. The pointer 22 turns round to the angle position where the rotation moment transferred in proportion to the rotation speed of the motor 3 is balanced with the spring force of the spring 23, whereby the speed is indicated. Consequently, if the speed of the driving motor 3 is controlled so as to be equivalent to the speed of the rotating shaft 11, i.e. the set speed, the accurate indication of the axle speed is possible.

The speed indicating section 2 is provided with a reed switch 27 as a second rotation indicator in the neighborhood of the permanent magnet 24b. Everytime the magnet 24b passes through the reed switch 27, its contact is closed so as to generate the motor speed pulse signal $P_M$ in accordance with the rotation speed of the driving motor 3. Consequently, if the rotation speed of the motor 3 is represented by $N_2$, frequency $f_2$ of the pulse signal $P_M$ becomes $f_2 = 4N_2$.

Both the speed pulse signal $P_S$ of the rotating shaft 11 and the speed pulse signal $P_M$ of the motor 3 are inputted into a motor driving circuit 4, which outputs the motor driving signal T in order to make the rotation speed $N_2$ of the motor 3 equivalent to the rotation speed $N_1$ of the rotating shaft 11.

The motor driving circuit 4 comprises waveform shaping circuits 401A, 401B, one-shot circuit 402A as a first pulse width setting means, one-shot circuit 402B as a second pulse width setting means, a logical operation circuit 403, an integrating circuit 404 and an amplifier circuit 405.

The speed pulse signals $P_S$ and $P_M$ are shaped in the waveform shaping circuits 401A and 401B respectively, and then converted into the set pulse signal $f_S$ and the rotation pulse $f_M$ with constant pulse width $T_1$, $T_2$ respectively by means of the one-shot circuits 402A and 402B. The logical operation circuit 403 produces the control signal H as hereinafter described from each of the signals $f_S$ and $f_M$. On the basis of the control signal H, the integrating circuit 404 produces the electric conduction signal $T_C$ which is increased or decreased at definite rate $\tau_1$, $\tau_2$. The amplifier circuit 405 amplifies the electric conduction signal $T_C$ in power amplification and produces the driving signal T to drive the D.C. motor 3.

The detailed structure and the operation of each of above-mentioned circuits will now be described.

Figure 2:
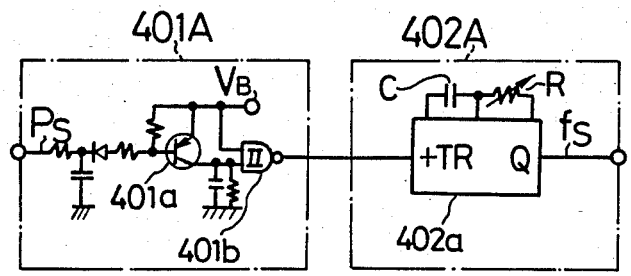
FIGS. 2 through 5 show a first embodiment of the invention.

FIG. 2 shows the waveform shaping circuit 401A and the one-shot circuit 402A. The waveform shaping circuit 401A comprises a transistor switching circuit 401a and NAND gate 401b (e.g. DC4093 made by RCA) with Schmidt trigger function. $V_B$ indicates the power source in FIG. 2.

The one-shot circuit 402A with a monostable multivibrator 402a (e.g. CD4528 made by RCA) outputs the set pulse signal $f_S$ of constant pulse width $T_1$ synchronizing with the speed pulse signal $P_S$. The pulse width $T_1$ of the set pulse signal $f_S$ may be set in any suitable value by a variable resistor R for setting a time constant which is installed in the multivibrator 402a and connected in series to the capacitor C.

The waveform shaping circuit 401B and the one-shot circuit 402B are composed in the same way as the circuits 401A and 402A respectively. In this embodiment, the value of the pulse width $T_1$ of the set pulse signal $f_S$ is equal to that of the pulse width $T_2$ of the rotation pulse signal $f_M$.

Figure 3:
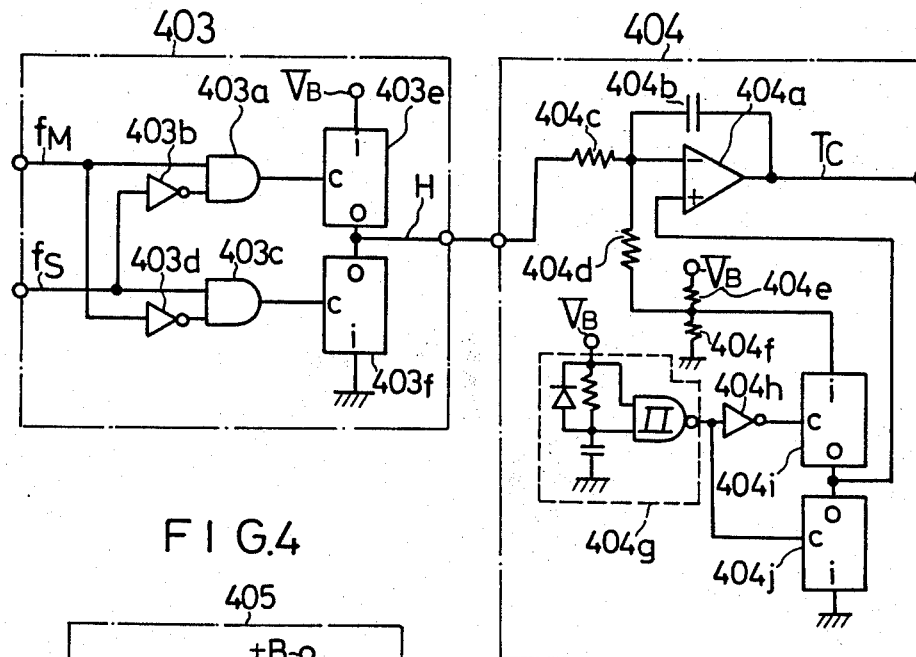

FIG. 3 shows the logical operation circuit 403 and the integrating circuit 404. The logical operation circuit 403 comprises AND gates 403a, 403c, inverters 403b, 403d, and analog switches 403e, 403f. In respect of the analog switches 403e and 403f, the i terminal is connected to the o terminal when the c terminal input is in the 1 state. Therefore, the control signal H as an output signal of the circuit takes three states, voltage value $V_B$, 0 and high-impedance in accordance with the binary state of the set pulse signal $f_S$ and the rotation pulse signal $f_M$. The data are tabulated as follows: where $H_Z$ indicates the high-impedance state.

| $f_S$ | $f_M$ | H |
|---|---|---|
| 0 | 0 | $H_Z$ |
| 1 | 0 | 0 |
| 0 | 1 | $V_B$ |
| 1 | 1 | $H_Z$ |

The integrating circuit 404 comprises an operational amplifier 404a, an integrating capacitor 404b, integrating resistors 404c, 404d, potentio-resistors 404e, 404f, analog switches 404i, 404j, an inverter 404h, and power-on reset circuit 404g. In respect of resistors 404e, 404f, the resistance values are equal to each other.

When the power is on, the power reset circuit 404g produces an output in the 1 state for a limited time. For this limited time, since the analog switch 404j is turned on, the noninverting terminal of the operational amplifier 404a is grounded and the voltage value $\frac{1}{2}V_B$ of the resistors 404e, 404f is inputted into the inverting terminal through the integrating resistor 404d. As a result, the integrating capacitor 404b is charged up to the voltage value $\frac{1}{2}V_B$ for the limited time. After the limited time, the output of the reset circuit 404g goes down into the 0 state and then analog switch 404i is turned on. In this way the voltage value $\frac{1}{2}V_B$ is inputted into the noninverting terminal of the operational amplifier 404a and because of the inverting terminal voltage being raised up to $\frac{1}{2}V_B$ the electric conduction signal $T_C$ which is outputted from the operational amplifier 404a becomes 0 in the voltage value, that is, integrating circuit 404 goes into stand-by.

The time constant of the integrating circuit 404 after stand-by is determined by the integrating resistor 404c and the integrating capacitor 404b. That is to say, while the control signal H is equal to the voltage value $V_B$, the voltage value of the electric conduction signal $T_C$ decreases at a constant gradient $\tau_2$, and while the control signal H is the voltage value 0, the electric conduction signal $T_C$ rises at a constant gradient $\tau_1$. While the control signal H is equivalent to high-impedance, the electric conduction signal $T_C$ is held in the voltge value at that time. In this embodiment the gradient values $\tau_1$, $\tau_2$ are equal to each other.

Figure 4:
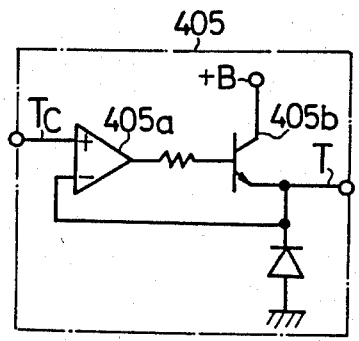
Figure 5:
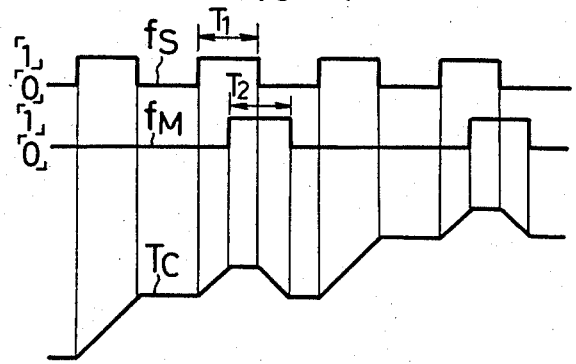
Figure 5:
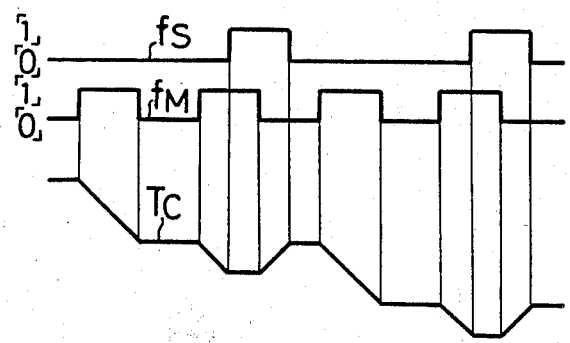
Figure 5:
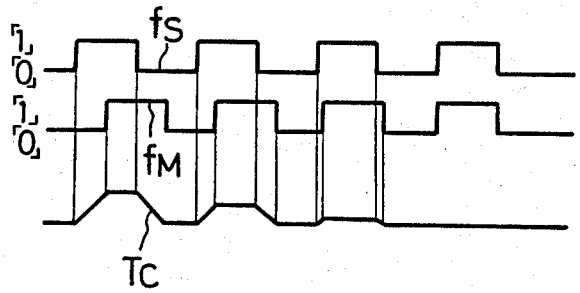

The electric conduction signal $T_C$ is amplified by the amplifier circuit 405 composed of an operational amplifier 405a and a transistor 405b as shown in FIG. 4, and the amplified signal is outputted as the driving signal T to the motor 3(refer to FIG. 1).

The control operation of the device will now be described by using FIGS. 5A to 5C. FIGS. 5A to 5C show the variation with the passage of time in the set pulse signal $f_S$, the rotation pulse signal $f_M$ and the electric conduction signal $T_C$ whose voltage value is changed, as mentioned above, according to the binary state of both signals.

When the frequency $f_1$ of the set pulse signal $f_S$ is far greater than the frequency $f_2$ of the rotation pulse signal $f_M$ (refer to FIG. 5A), that is, when the speed $N_2$ of the motor 3 is far more delayed than the speed $N_1$ of the rotating shaft 11 (refer to FIG. 1), it is more often, as shown in the diagram, that the signal $f_S$ is in the 1 state and the signal $f_M$ is in the 0 state. As a result, the voltage value of the electric conduction signal $T_C$ rapidly becomes so high as to accelerate the motor 3.

On the contrary, when the frequency $f_1$ of the set pulse signal $f_S$ is far less than the frequency $f_2$ of the rotation pulse signal $f_M$(refer to FIG. 5B), that is, when the speed $N_2$ of the motor 3 is much greater than the speed $N_1$ of the rotating shaft 11 (refer to FIG. 1), it is more often that the signal $f_S$ is in the 0 state and the signal $f_M$ is in the 1 state and then the voltage value of the electric conduction signal $T_C$ rapidly becomes so low as to decelerate the motor 3.

When the speed $N_1$ of the rotating shaft 11 is almost equal to the speed $N_2$ of the motor 3 (refer to FIG. 5C), the electric conduction signal $T_C$, which is changed according to the binary state of the signals $f_S$, $f_M$, is changed so that the phase difference between both signals $f_S$ and $f_M$ is eliminated. When the phase difference disappears, that is, when the speed $N_1$ of the rotating shaft 11 is completely equal to the speed $N_2$ of the motor 3, the changing is stopped and the speed becomes constant. In this way the speed $N_2$ of the motor 3 follows the speed $N_1$ of the rotating shaft 11, and when both speeds become coincident the frequencies $f_1$ and $f_2$ are equivalent to each other.

In short, the motor speed controlling device of the invention compares the binary state of the set pulse signal having the constant pulse width $T_1$ and the frequency $f_1$ proportional to the speed $N_1$ of the rotating shaft and the rotation pulse signal having the constant pulse width $T_2$ equal to $T_1$ and the frequency $f_2$ proportional to the speed $N_2$ of the motor (this frequency $f_2$ is equal to the frequency $f_1$ when the speed $N_2$ of the motor is coincident to the speed $N_1$ of the rotating shaft) respectively, and when both signals are different in the binary state the electric conduction signal is increased or decreased at the same rate so as to make the speed of the motor accurately follow the speed of the rotating shaft.

In the first embodiment as above described, four magnetic poles are formed on the outer circumference of the rotating shaft 11 and also four magnetic poles are formed on the outer circumference of the output shaft 31 of the motor 3. However, when the existing speed detecting sensor is available, poles of both shafts are not always the same in number. For example, if the poles on the rotating shaft 11 are six in number, the frequency $f_1$ of the rotating shaft speed pulse signal $P_S$ becomes $f_1=6N_1$, where $N_1$ is the speed of the rotating shaft 11.

In this example, based on the frequencies $f_1$, $f_2$ which are obtained when the rotation speed $N_1$ is equal to the speed $N_2$ of the motor 3, the pulse width $T_2$ of the rotation pulse signal $f_M$ may be set by means of the variable resistor R in the one-shot circuit 402B as follows:

$$T_2 = f_1/f_2 \cdot T_1 = 6N_1/4N_2 \cdot T_1 = 6N_1/4N_1 \cdot T_1 = 1.5T_1$$

Figure 6A:
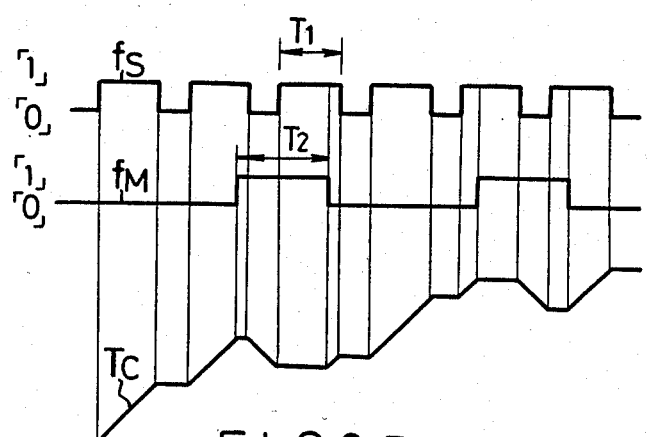
FIGS. 6A to 6C are time charts showing the controlling motion in a second embodiment.
Figure 6B:
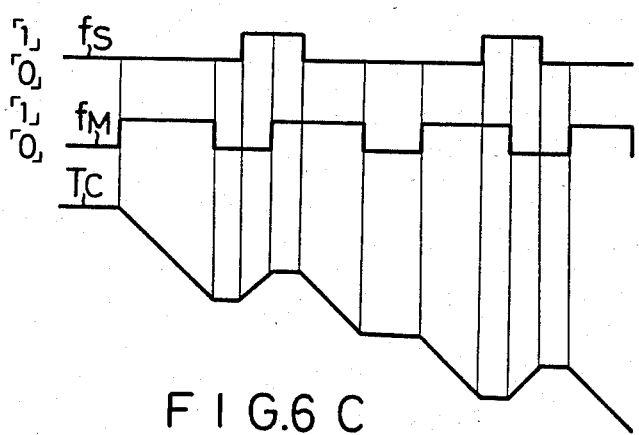
Figure 6C:
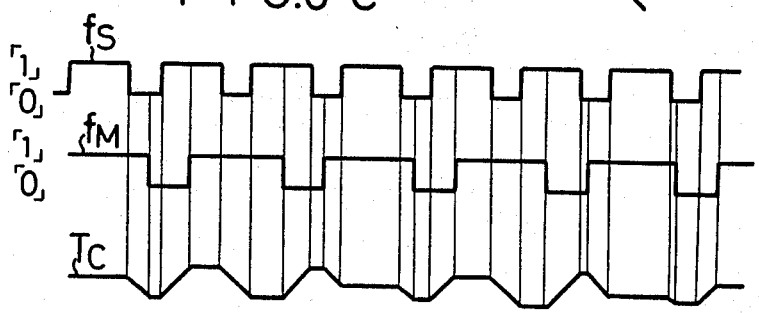

In the second embodiment, variation with the passage of time in the set pulse signal $f_S$, the rotation pulse signal $f_M$ and the electric conduction signal $T_C$ is shown in FIGS. 6A to 6C.

When the speed $N_2$ of the motor 3 is less than the speed $N_1$ of the rotating shaft 11 (refer to FIG. 1), it is more often, as shown in FIG. 6A, that the signal $f_S$ is in the 1 state and the signal $f_M$ is in the 0 state. As a result, the voltage value of the electric conduction signal $T_C$ rapidly becomes so high as to accelerate the motor 3.

On the contrary, when the speed $N_2$ of the motor 3 is greater than the speed $N_1$ of the rotating shaft 11, as shown in FIG. 6B, it is more often that the signal $f_S$ is in the 0 state and the signal $f_M$ is in the 1 state and then the voltage value of the electric conduction signal $T_C$ rapidly becomes so low as to decelerate the motor 3.

In this way, when the speed $N_2$ of the motor 3 corresponds to the speed $N_1$ of the rotating shaft 11, the frequencies $f_1$, $f_2$ of both pulse signals $f_S$, $f_M$ are represented as $f_1=6N_1$, $f_2=4N_1$. Because the pulse widths $T_1$, $T_2$ of the pulse signals $f_S$, $f_M$ are represented by $$T_2 = 1.5T_1 = f_1/f_2 \cdot T_1$$

that is $$T_1 \cdot f_1 = T_2 \cdot f_2$$

as shown in FIG. 5C, with respect to the electric conduction signal $T_C$, which is changed according to the binary state of $f_S$ and $f_M$, the portion of increase becomes equal to that of decrease at a relatively long interval, so that the speed of the motor 3 becomes constant.

Figure 7:
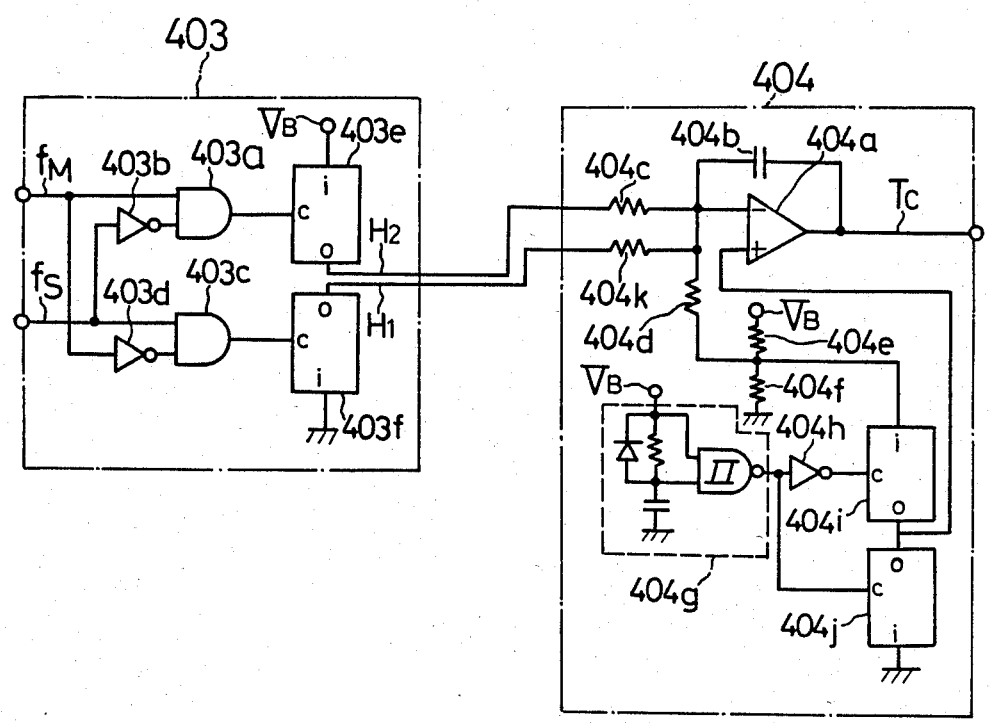

The third embodiment of the invention is shown in FIG. 7 and FIG. 8. The embodiment shows the case that the number of the poles formed on the rotating shaft 11 is quite different from that on the output shaft 31 of the motor 3, for example, the case that the latter is four as shown in the first embodiment and the former 25. In this case, as shown in the second embodiment, if the pulse width $T_2$ of the rotation pulse signal $f_M$ is set by $$T_2 = f_1/f_2 \cdot T_1 = 25N_1/4N_1 \cdot T_1 = 6.25T_1$$

then the same effect as the second embodiment can be obtained. However, in case the speed to be followed by the motor 3 is rather higher, the pulse width $T_2$ can not always be made so large as to satisfy the above-mentioned formula.

Therefore, in the third embodiment, the increase rate $\tau_1$ of the electric conduction signal $T_C$ is different from the decrease rate $\tau_2$ thereof and the rates $\tau_1, \tau_2$ are set so as to satisfy the following formula:

$$T_1 \cdot f_1 \cdot \tau_1 = T_2 \cdot f_2 \tau_2$$

where the frequencies $f_1$, $f_2$ are those at the time when the rotation speed $N_1$ of the rotating shaft 11 corresponds to the rotation speed $N_1$ of the motor 3. Since $f_1=25N_1$, $f_2=4N_1$, the above-mentioned formula is represented by $25 \cdot T_1 \cdot \tau_1 = 4 \cdot T_2 \cdot \tau_2$. For example, if the possible maximum value of the pulse width $T_2$ is $T_2 = 2.5 T_1$, the gradient $\tau_2$ is set to $\tau_2 = 2.5\tau_1$ so as to satisfy the above formula.

The circuit which sets the different gradients $\tau_1$, $\tau_2$ is shown in FIG. 7. In the figure, the integrating circuit 404 has the integrating resistor 404c in previous embodiments and an additional integrating resistor 404k whose value is different from that of the former. The resistor 404c is connected to the terminal o of the analog switch 403e in the logical operation circuit 403 and the resistor 404k is connected to the terminal o of the analog switch 403f. The other parts of the composition are the same as in the first and second embodiments.

The control signals $H_1$, $H_2$ which are the output signals of the logical operation circuit 403, take three states, the voltage value $V_B$, 0 and high-impedance according to the binary state of the set pulse signal $f_S$ and the rotation pulse signal $f_M$. They are tabulated as follows: where $H_Z$ is the state of high-impedance.

| $f_S$ | $f_M$ | $H_1$ | $H_2$ |
| --- | --- | --- | --- |
| 0 | 0 | $H_Z$ | $H_Z$ |
| 1 | 0 | 0 | $H_Z$ |
| 0 | 1 | $H_Z$ | $V_B$ |
| 1 | 1 | $H_Z$ | $H_Z$ |

When the control signal $H_1$ is the voltage value 0, the electric conduction signal $T_C$ as integrating output of the integrating circuit 404 increases at the constant gradient $\tau_1$ determined by the integrating resistor 404k and the integrating capacitor 404b, and when the control signal $H_2$ is the voltage value $V_B$, it decreases at the constant gradient $\tau_2$ determined by the integrating resistor 404c and the integrating capacitor 404b. When both control signals $H_1$, $H_2$ are high-impedance, the electric signal $T_C$ is held in value at the time.

Figure 8A:
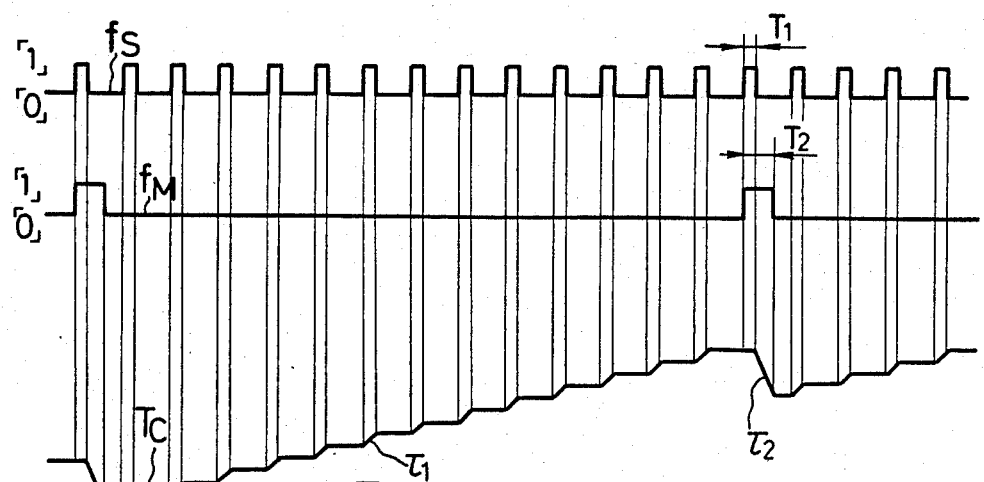
FIGS. 8A to 8C are time charts showing the controlling motion.
Figure 8B:
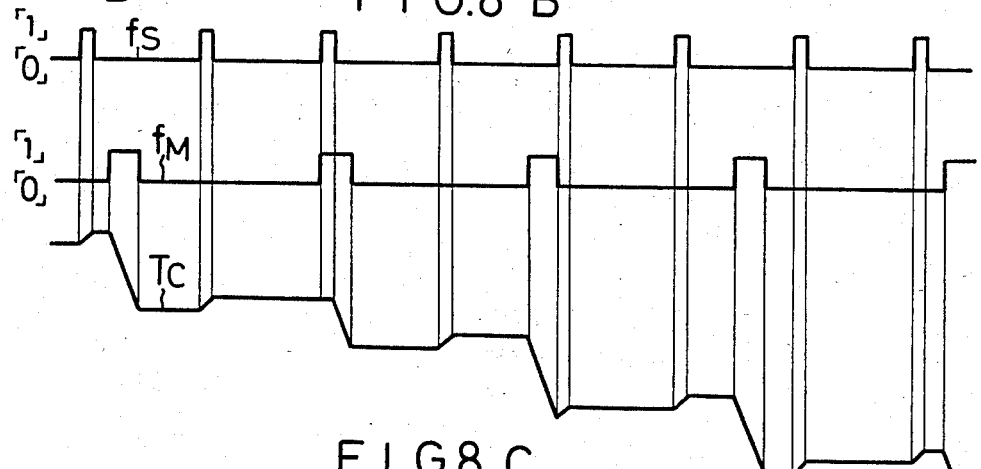

When the speed $N_2$ of the motor 3 is less than the speed $N_1$ of the rotating shaft 11, as shown in FIG. 8A, the voltage value of the electric conduction signal $T_C$ rapidly becomes so high as to accelerate the motor 3. On the contrary, when the speed $N_2$ of the motor 3 is greater than the speed $N_1$ of the rotating shaft 11, as shown in FIG. 8B, the voltage value of the electric conduction signal $T_C$ rapidly becomes so low as to decelerate the motor 3.

In this way when the speed $N_2$ of the motor 3 corresponds to the speed $N_1$ of the rotating shaft 11, the frequencies $f_1$, $f_2$ of both pulse signals $f_S$, $f_M$ become $f_1=25N_1$, $f_2=4N_1$.

Figure 8C:
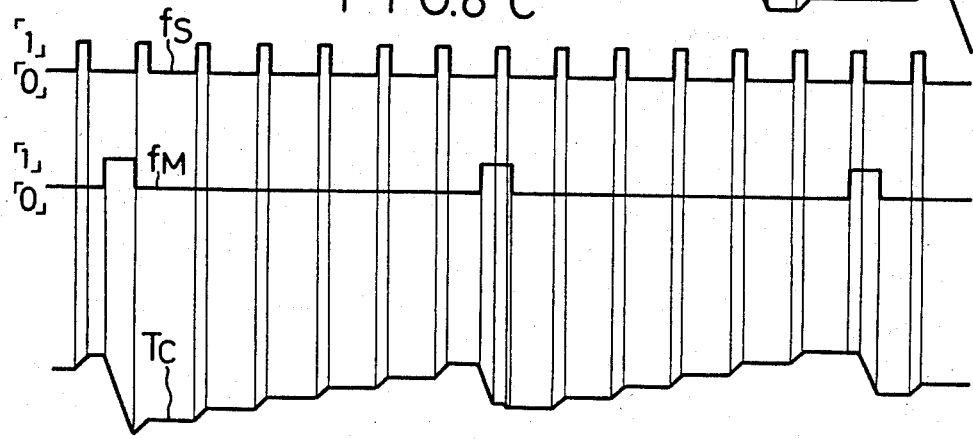

Because the integrating constants $\tau_1, \tau_2$ and the pulse widths $T_1$, $T_2$ of the pulse signals $f_S$, $f_M$ are represented by $$25 \cdot T_1 \cdot \tau_1 = 4 \cdot T_2 \cdot \tau_2$$

that is $$f_1 \cdot T_1 \cdot \tau_1 = f_2 \cdot T_2 \cdot \tau_2$$

as shown in FIG. 8C, with respect to the electric conduction signal $T_c$, which is changed according to the binary state of the pulse signals $f_S$ and $f_M$, the portion of increase becomes equal to that of decrease at a relatively long interval, so that the speed of the motor 3 becomes constant.

Accoding to the embodiment, in the case that the frequencies $f_1$, $f_2$ are quite different from each other at the time when the rotation speed of the rotating shaft 11 corresponds to that of the output shaft 31 of the motor 3, the speed of the motor 3 can accurately follow the speed of the rotating shaft 11 by modifying the gradients $\tau_1, \tau_2$ at increasing or decreasing the electric conduction signal $T_c$, i.e. the driving signal T, in addition to the pulse widths $T_1$, $T_2$ of the pulse signals $f_S$, $f_M$.

As mentioned above, a motor speed controlling device of this invention discriminates the binary state of signals—the set pulse signal having the constant pulse width and the frequency proportional to the set speed, and the rotation pulse signal having the constant pulse width and the frequency proportional to the speed of the motor—and keeps constant the driving signal to the motor when the binary state of the two signals are equal to each other, and changes the driving signal to the motor at the constant rate when the binary state of the two signals are different from each other, and then can make the motor speed accurately follow the set speed.

A motor speed controlling device of this invention does not need any signal conversion such as digital-analog conversion or any arithmetic operation, so the composition of the circuits is simple and cheap. Therefore, it can be applied to the speedometer for a vehicle quite easily.

In each of the above-mentioned embodiments, with respect to pulse widths of the set pulse signal and the rotation pulse signal or the changing rate of the driving signal, the optimum values should be selected by checking the real control action of the motor.

What is claimed is:

1. A motor speed controlling device wherein rotation speed of a motor is controlled and made coincident with a set speed, said controlling device comprising:
   a set pulse signal generating means for generating a set pulse signal ($f_S$) having constant pulse width ($T_1$) and frequency ($f_1$) proportional to said set speed varying with the passage of time;
   a rotation pulse signal generating means for detecting the rotation speed of said motor and generating a rotation pulse signal ($f_M$) having constant pulse width ($T_2$) and frequency ($f_2$) proportional to said rotation speed; and
   a motor driving means for discriminating binary states of said set pulse signal ($f_S$) and said rotation pulse signal ($f_M$) to hold a driving signal (T) of said motor to a constant value if the binary states of both signals ($f_S$, $f_M$) are the same and increase said driving signal (T) of said motor at one definite gradient ($\tau_1$) or decrease said driving signal (T) at another definite gradient ($\tau_2$) if the binary states of both signals ($f_S$, $f_M$) are different.

2. A motor speed controlling device as set forth in claim 1, wherein said set pulse generating means comprises a rotating shaft rotating at said set speed, a first rotation detector for generating rotating shaft speed pulse signal ($P_S$) having the frequency ($f_1$) proportional to the rotation speed of said rotating shaft, and a first pulse width setting means for generating said set pulse signal ($f_S$) of the constant pulse width ($T_1$) everytime said rotating shaft speed pulse signal ($P_S$) is inputted; and said rotation pulse signal generating means comprises a second rotation detector for generating motor speed pulse signal ($P_M$) having frequency ($f_2$) proportional to the rotation speed of an output shaft of said motor, and a second pulse width setting means for generating said rotation pulse signal ($f_M$) of the constant pulse width ($T_2$) everytime said motor speed pulse signal ($P_M$) is inputted.

3. A motor speed controlling device as set forth in claim 2, wherein magnetic poles spaced at regular intervals are formed on outer circumferences of said rotating shaft and said output shaft of said motor respectively, and said first and second rotation detectors are opposed to said outer circumferences of said rotating shaft and said output shaft and generates said rotating shaft speed pulse signal ($P_S$) and said motor speed pulse signal ($P_M$) respectively everytime said magnetic pole passes.

4. A motor speed controlling device as set forth in claim 3, wherein said first and second rotation detectors are reed switches operated by the magnetic force of said magnetic pole everytime the magnetic pole passes.

5. A motor speed controlling device as set forth in claim 2, wherein said first and second pulse width setting means are monostable multivibrators respectively, said monostable multivibrators being triggered respectively by said rotating shaft speed pulse signal ($P_S$) and said motor speed pulse signal ($P_M$) and generating said set pulse signal ($f_S$) and said rotation pulse signal ($f_M$) having constant pulse widths ($T_1$, $T_2$) each determined by a capacitor and a resistor for setting a time constant.

6. A motor speed controlling device as set forth in claim 11, wherein said motor is provided on the outer circumference of said output shaft with the magnetic poles having the same number as the magnetic poles formed on the outer circumference of said rotating shaft, and each of said monostable multivibrators constituting said first and second pulse width setting means has said time-constant setting capacitor and resistor in the same value.

7. A motor speed controlling device as set forth in claim 1, wherein said rotation pulse signal generating means generates the rotation pulse signal ($f_M$) having said frequency ($f_2$) different from said frequency ($f_1$) and said pulse width ($T_2$) different from said pulse width ($T_1$) when the rotation speed of said motor corresponds to said set speed, said frequencies ($f_1$, $f_2$) and said pulse widths ($T_1$, $T_2$) satisfying formula $f_1 \cdot T_1 = f_2 \cdot T_2$ and said motor driving means sets said gradients ($\tau_1$, $\tau_2$) to be equal to each other.

8. A motor speed controlling device as set forth in claim 7, wherein said motor is provided on the outer circumference of said output shaft with the magnetic poles having the number different from that of the magnetic poles formed on the outer circumference of said rotating shaft, and each of said monostable multivibrators constituting said first and second pulse width setting means selects the value of said time-constant setting capacitor and resistor so that said pulse widths ($T_1$, $T_2$) satisfy the formula $f_1 \cdot T_1 = f_2 \cdot T_2$.

9. A motor speed controlling device as set forth in claim 1, wherein said motor driving means increases said driving signal ($T$) at definite gradient ($\tau_1$) when said set pulse signal ($f_S$) is in the 1 state and said rotation pulse signal ($f_M$) is in the 0 state, and decreases said driving signal at definite gradient ($\tau_2$) when said set pulse signal ($f_S$) is in the 0 state and said rotation pulse signal ($f_M$) is in the 1 state.

10. A motor speed controlling device as set forth in claim 1, wherein said motor driving means comprises a logical operation circuit for discriminating the binary state of said set pulse signal ($f_S$) and said rotation pulse signal ($f_M$) respectively, and a resistor-capacitor integrating circuit for producing the integrating output as said driving signal, said integrating circuit performing the integrating operation of positive constant voltage at definite gradient ($\tau_1$) determined by the integrating resistor and the integrating capacitor provided therein when one of said set pulse signal and said rotation pulse signal ($f_M$) is in the 1 state and other is in the 0 state and performing the integrating operation of negative constant voltage at definite gradient ($\tau_2$) determined by other integrating resistor and the integrating capacitor when one of both signals is in the 0 state and other is in the 1 state.

11. A motor speed controlling device as set forth in claim 1, wherein said rotation pulse signal generating means generates said rotation pulse signal ($f_M$) having said frequency ($f_2$) equivalent to said frequency ($f_1$) and said pulse width ($T_2$) equal to said pulse width ($T_1$) when the rotation speed of said motor corresponds to said set speed, and said motor driving means sets said gradients ($\tau_1, \tau_2$) to the same value.

12. A motor speed controlling device as set forth in claim 10, wherein said rotation pulse signal generating means generates the rotation pulse signal ($f_M$) having said frequency ($f_2$) different from said frequency ($f_1$) and said pulse width ($T_2$) different from said pulse width ($T_1$) when the rotation speed of said motor corresponds to said set speed, said frequencies ($f_1$, $f_2$) and said pulse widths ($T_1$, $T_2$) not satisfying the formula $f_1 \cdot T_1 = f_2 \cdot T_2$, and said motor driving means sets said gradients ($\tau_1$, $\tau_2$) so that formula $f_1 \cdot T_1 \cdot \tau_1 = f_2 \cdot T_2 \cdot \rho_2$ is satisfied.

13. A motor speed controlling device as set forth in claim 2, wherein said rotating shaft is connected to an axle of a vehicle, and the output shaft of said motor is connected through eddy-current coupling to an indicating pointer of a speedometer.

* * * * *